US012768781B2

(12) United States Patent
Bundulis et al.

(10) Patent No.: US 12,768,781 B2
(45) Date of Patent: Oct. 20, 2026

(54) SELECTIVE GAS SENSOR

(71) Applicant: LATVIJAS UNIVERSITĀTES CIETVIELU FIZIKAS INSTITŪTS, Riga (LV)

(72) Inventors: Arturs Bundulis, Riga (LV); Gatis Mozolevskis, Riga (LV); Edvins Letko, Jelgava (LV); Aleksejs Bendins, Riga (LV)

(73) Assignee: LATVIJAS UNIVERSITATES CIETVIELU FIZIKAS INSTITUTS, Riga (LV)

( * ) Notice: Subject to any disclaimer, the term of this patent is extended or adjusted under 35 U.S.C. 154(b) by 59 days.

(21) Appl. No.: 19/116,138

(22) PCT Filed: Aug. 29, 2023

(86) PCT No.: PCT/LV2023/050013

§ 371 (c)(1),
(2) Date: Mar. 27, 2025

(87) PCT Pub. No.: WO2024/072198

PCT Pub. Date: Apr. 4, 2024

(65) Prior Publication Data

US 2026/0104358 A1 Apr. 16, 2026

(30) Foreign Application Priority Data

Sep. 30, 2022 (LV) ................................ P2022000079

(51) Int. Cl.
*G01N 21/45* (2006.01)

(52) U.S. Cl.
CPC ..... *G01N 21/45* (2013.01); *G01N 2201/0407* (2013.01); *G01N 2201/08* (2013.01); *G01N 2223/04* (2013.01)

(58) Field of Classification Search
CPC ........... G01N 21/45; G01N 2201/0407; G01N 2201/08; G01N 2223/04; G01N 2021/458; G01N 2021/7779
See application file for complete search history.

(56) References Cited

U.S. PATENT DOCUMENTS

| | | | | |
|---|---|---|---|---|
| 5,262,842 | A | 11/1993 | Gauglitz et al. | |
| 2006/0034569 | A1 * | 2/2006 | Shih | G01D 5/35383 385/12 |
| 2014/0246610 | A1 * | 9/2014 | Harpin | G01D 5/35329 250/227.14 |

FOREIGN PATENT DOCUMENTS

| | | |
|---|---|---|
| WO | 2009115847 A1 | 9/2009 |
| WO | 2021152345 A1 | 8/2021 |

OTHER PUBLICATIONS

International Search report for PCT/LV2023/050013, prepared by the European Patent Office, mailing date Dec. 5, 2023, 6 pages.

(Continued)

*Primary Examiner* — Seung C Sohn
(74) *Attorney, Agent, or Firm* — Brooks Kushman P.C.

(57) ABSTRACT

A selective gas sensor has a light source, a sensor chip and a light detector. The sensor chip has an optical input and an optical output. The light source is optically connected with the optical input of the sensor chip. The optical output of the sensor chip is optically connected with the optical input of the light detector with ability to guide a light from the light source output to the optical input of the light detector The sensor chip includes a substrate, an asymmetric Mach-Zehnder interferometer, including multiple asymmetrical Mach-Zehnder interferometer structures optically connected in parallel, each having different pores size of the polymer cladding and has multiple outputs that correspond to each of the Mach-Zehnder interferometer structures outputs The pore sizes of each polymer cladding differ by 0.02 nm to 0.1

(Continued)

nm. A method for manufacturing the proposed selective gas sensor is also disclosed.

13 Claims, 4 Drawing Sheets

(56) References Cited

OTHER PUBLICATIONS

Written Opinion for PCT/LV2023/050013, prepared by the European Patent Office, mailing date Dec. 5, 2023, 5 pages.
Tatevik Chalyan et al.: Asymmetric Mach-Zehnder Interferometer Based Biosensors for Aflatoxin M1 Detection, col. 6, No. 1, Jan. 6, 2026, XP055693571, DOI: 10.3390/bios6010001.
Liu, X. et al., A Survey on Gas Sensing Technology, Sensors 2012, 12, 9635-9665; doi: 10.3390/s120709635, 9635-9665, 31 pages.
Bamiedakis N. et al., PCB-Integrated Optical Waveguide Sensors: An Ammonia Gas Sensor, Journal of Lightwave Technology, vol. 31, No. 10, May 15, 2013, 1628-1635, 8 pages.
Ali, A. R. et al., Ultra-Sensitive Optical Resonator for Organic Solvents Detection Based on Whispering Gallery Modes, Chemosensors May 19, 2017; doi: 10.3390/chemosensors5020019, 10 pages.
Foreman M. R. et al., Whispering gallery mode sensors, Advances in Optics and Photonics 7, May 22, 2015, 168-240, 73 pages.
Hugon O. et al., Surface plasmon chemical: biological sensor in integrated optics Sensors Actuators B Chem. 51, 316-320 (1998), 5 pages.
Sturaro M. et al., Near Infrared Plasmonic Gas Sensing with Doped Metal Oxide Nanocrystals, Proceedings 1, 319 (2017), 4 pages.
Qin, J. et al., Efficient Plasmonic Gas Sensing Based on Cavity-Coupled Metallic Nanoparticles, J. Phys. Chem. C 121, 24740-24744 (2017), 5 pages.
St-Gelais, R. et al., Gas sensing using polymer-functionalized deformable Fabry-Perot interferometers, Sensors Actuators B Chem. 182, 45-52 (2013), 8 pages.
Gouvea P. M. P. et al., Component and setup for insertion of gases in a hollow-core optical fiber sensor, 24th International Conference on Optical Fibre Sensors, vol. 9634, 96343D96343D (2015), 4 pages.
GazDetect, Semiconductor sensor technology 4-20mA detector/transmiter, 3, rue des Fosses, 77240 Saint Denis, France, 1 page.
Aeroqual, Volatile Organic Compounds, VOC Analyzer Module (High Range 0-30ppm, 1 page.
Evikon MCI OÜ, Solvent Vapor Detector-Transmitter, Evikon Sensor Technologies Measurement & Control Instrumentation, Updated Jul. 27, 2022, 2 pages.
Tiger XT, Pioneering Gas Sensing Technology, lon Science, 4 pags.

* cited by examiner

SELECTIVE GAS SENSOR

CROSS-REFERENCE TO RELATED APPLICATION

This application is the U.S. national phase of PCT Application No. PCT/LV2023/050013 filed on Aug. 29, 2023, which claims priority to LV Patent Application No. LVP2022000079 filed on Sep. 30, 2022, the disclosures of which are incorporated in their entirety by reference herein.

TECHNICAL FIELD

The present invention relates to a sensor for detecting the presence of ammonia gas and/or ammonia vapor and a manufacturing method for said sensor.

BACKGROUND ART

Ammonia ($NH_3$) is a colourless caustic and hazardous gas and can seriously damage the skin, eyes, and respiratory system of anyone that comes in contact with it. Ammonia is a natural by-product of manure, making its monitoring critical in poultry farms and livestock farms, to ensure an optimal environment for animals and people working with them. As ammonia is highly corrosive and hazardous it is challenging to design sensors with a lifespan longer than one year.

This is especially potent for the poultry sector where one cycle can last for 52 weeks, which sets the minimum necessary sensor lifespan. During this time, the sensors are used to monitor ammonia levels to see if they are within allowed limits, meaning that they are exposed to ammonia the entire cycle time. This puts longevity as the main issue of ammonia sensors.

Currently, most ammonia detectors are based on electrochemical sensors. While this method gives a reliable signal and moderate lifespan (around one year), sensor degradation and high-cost leave the room for improvement [1]. Other alternatives include Photoionization Detectors (PID), which are quite robust to ammonia degradation, but are relatively expensive [2].

There is known alternative to the previously mentioned sensors—an all-optical sensor based on an asymmetrical Mach-Zehnder Interferometer (MZI) [3, 15, 16, 17]. This sensor is based on organic materials that are robust to ammonia and cheap.

The information of the known types of gas sensor technologies is summarized in the table 1.

TABLE 1

Summary of gas sensor technologies.

| Method/ alternative | Advantages | Disadvantages |
|---|---|---|
| Photoionization Detectors (PID) | (a) Excellent separation performance; (b)High sensitivity and selectivity. | a) High-cost b) Devices are more applicable for high sensitivity cases |
| Gas Sensitive Semi-conductors (GSS) | (a)Low cost; (b)Short response time; (c)Wide range of target gases; (d)Long lifetime. | a) Relatively low sensitivity and selectivity; (b)Sensitive to environmental factors; (c)High energy consumption. (d)Sensitive to Ammonia degradation |
| Pellistors (Calorimetric Methods) | a) Stable at ambient temperature; (b)Low cost; (c)Adequate sensitivity for industrial detection (ppth range) | a) Risk of catalyst poisoning and explosion; (b)Intrinsic deficiencies in selectivity. |
| Infra-red detectors | (a)High sensitivity, selectivity, and stability; (b)Long lifetime; (c)Insensitive to environmental change. | (a)Difficulty in miniaturization; (b)High cost. |

From a device manufacturing point of view, devices based on optical absorption or refractive index changes are simple to implement. For devices employing absorption technology, the biggest issue is light sources. Many gases have strong absorption in the mid-infrared spectrum. However, for this spectral region, most of the lights have low output power and need cooling systems. Regarding waveguide devices, the design can be tuned to work for different light sources [3]. The use of interference as a detection method also enhances the sensitivity as this allows the detection of small changes in the refractive index of cladding material. Due to this, detection through refractive index changes is probably the best choice.

Regarding devices employing refractive index changes, the Mach-Zehnder interferometer (MZI) is not the only design type applicable for such a detection method. Device designs employing a similar detection method have been reported using whispering gallery mode resonators [4; 5], plasmonic devices [6, 7, 8], Fabry-Perot [9] interferometers as well as hollow core fibres [10].

Compared to the whispering gallery mode approach, MZI has lower demands for the fabrication process, as it is necessary to place the resonant structure close enough to the waveguide to ensure efficient coupling between the waveguide and the resonator. In case of inefficient coupling, the sensitivity of the device will drastically decrease.

Most of the plasmonic devices employ some type of metallic nanoparticles or metallic layers, again complicating their manufacturing.

While Fabry-Perot gas sensors are similar to the proposed technology as it also employs porous polymer as gas sensitive medium, examples present in literature use deformation and not refractive index changes due to gas absorption as well as optical fibres for light guiding, meaning that the device does not have an integrated light guiding elements. While for signal sensors this might not be an essential problem, as optical fibres are widely used for optical signal coupling into optical devices, when scaling systems to multiple sensors on a single chip, more complicated fibres for light coupling into the device would be necessary.

Lastly, hollow core fibre gas sensors typically are quite large with fibre/gas interaction length reaching an order of meters. While these types of sensors are precise, they are limited by their interaction length and cannot be made small and portable.

In summary, compared to other gas sensors employing refractive index changes, the most important advantage of the design as per present invention, is its relatively simple manufacturing. Most of the commercially available devices now are either based on gas-sensitive semiconductors (GSS) [11; 13], or photoionization detectors (PID) [12; 14], which are mainly based on gas detection through electrical signals, making optical sensors unique in the modern gas sensor market.

DISCLOSURE OF THE INVENTION

The goal of the invention is to provide an effective sensor for detecting the presence of ammonia gas and/or ammonia vapor in the environment, which would solve disadvantages of the prior art solutions.

The set goal is reached by providing a selective gas sensor, comprising a light source, a sensor chip and a light detector; the sensor chip having an optical input and an optical output, where the light source is optically connected with the optical input of the sensor chip; the optical output of the sensor chip is optically connected with the optical input of the light detector with ability to guide a light from the light source output to the optical input of the light detector; wherein the sensor chip comprises a substrate, an asymmetric Mach-Zehnder interferometer, comprising multiple asymmetrical Mach-Zehnder interferometer structures optically connected in parallel, each having different pores size of the polymer cladding and has multiple outputs that correspond to each of the Mach-Zehnder interferometer structures outputs; wherein the pore sizes of each polymer cladding differ by 0.02 nm to 0.1 nm. According to one embodiment, the polymer cladding one has pores size from 0.23 nm to 0.35 nm; the polymer cladding two has pores size from 0.18 nm to 0.25 nm; the polymer cladding three has pores size from 0.13 nm to 0.2 nm; the polymer cladding four has pores size from 0.08 nm to 0.15 nm.

The set goal is also reached by providing a method for manufacturing of the sensor chip for the selective gas sensor, comprising the following steps: (i) providing at least one substrate, comprising of a glass, a quartz, or a polymer film; (ii) depositing on the substrate at least one photoresist layer of epoxy-based negative photoresist; (iii) creation at least two optically connected in parallel Mach-Zehnder interferometer structures in the polymer layer; (iv) deposition of polymer claddings on each Mach-Zehnder interferometer structure; (v) thermal treatment of the polymer claddings selecting thermal treatment time and temperature to create the desired pores size of each polymer claddings to obtain different pores size of the polymer claddings on respective Mach-Zehnder interferometer structures. According to one embodiment, at the step (iii) at least four optically connected in parallel Mach-Zehnder interferometer structures are created in the polymer layer. According to particular embodiment, the thermal treatment of the polymer claddings at the step (v) is made by keeping first polymer cladding at the temperature from 60 to 75° C. for 60-300 seconds; second polymer cladding at the temperature from 75 to 90° C. for 60-300 seconds; third polymer cladding at the temperature from 90 to 105° C. for 60-300 seconds; fourth polymer cladding at the temperature from 105 to 120° C. for 60-300 seconds.

The set goal is also reached by use of the proposed sensor chip in selective gas sensor.

DETAILED DESCRIPTION

Figure 1:
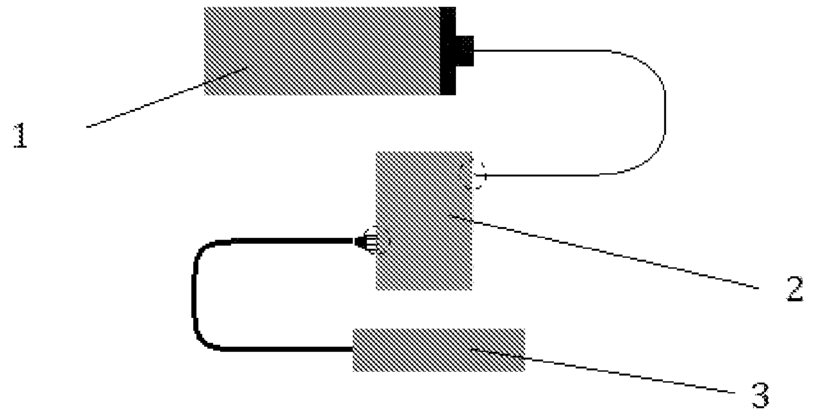
FIG. 1 shows principal scheme of the device.

The proposed selective gas sensor (FIG. 1), comprises a light source (1), a sensor chip (2) and a light detector (3). The sensor chip (2) is designed to have an optical input (20) and an optical output (21), where the light source (1) is optically connected with the optical input (20) of the sensor chip (2). The optical output (21) of the sensor chip (2) is optically connected with the optical input of the light detector (3) with ability to guide a light from the light source (1) output, through the sensor chip (2), to the optical input of the light detector (3).

The sensor chip (2) comprises a substrate (22), an asymmetric Mach-Zehnder interferometer (23), having an input (24) and an output (25); and a cladding (30).

According to the invention, the substrate (22) can be a glass, or a quartz, or a polymer film.

The asymmetric Mach-Zehnder interferometer (23) comprises multiple asymmetrical Mach-Zehnder interferometer structures (23', 23'', 23''', 23'''') optically connected in parallel (FIG. 2), each having different pores size of the polymer cladding (31, 32, 33, 34) that covers both the reference arm and the measurement arm of each respective Mach-Zehnder interferometer and has multiple outputs that correspond to each of the Mach-Zehnder interferometer structures (23', 23'', 23''', 23'''') outputs. The pore sizes of each polymer cladding (31, 32, 33, 34) differ by 0.02 nm to 0.1 nm.

The cladding material may be a organic polymer, for instance, poly(methyl methacrylate), or polysulfon.

According to the preferred embodiment, the light source (1), the sensor chip (2), and the light detector (3) are optically connected with an optical fiber (40).

Figure 2:
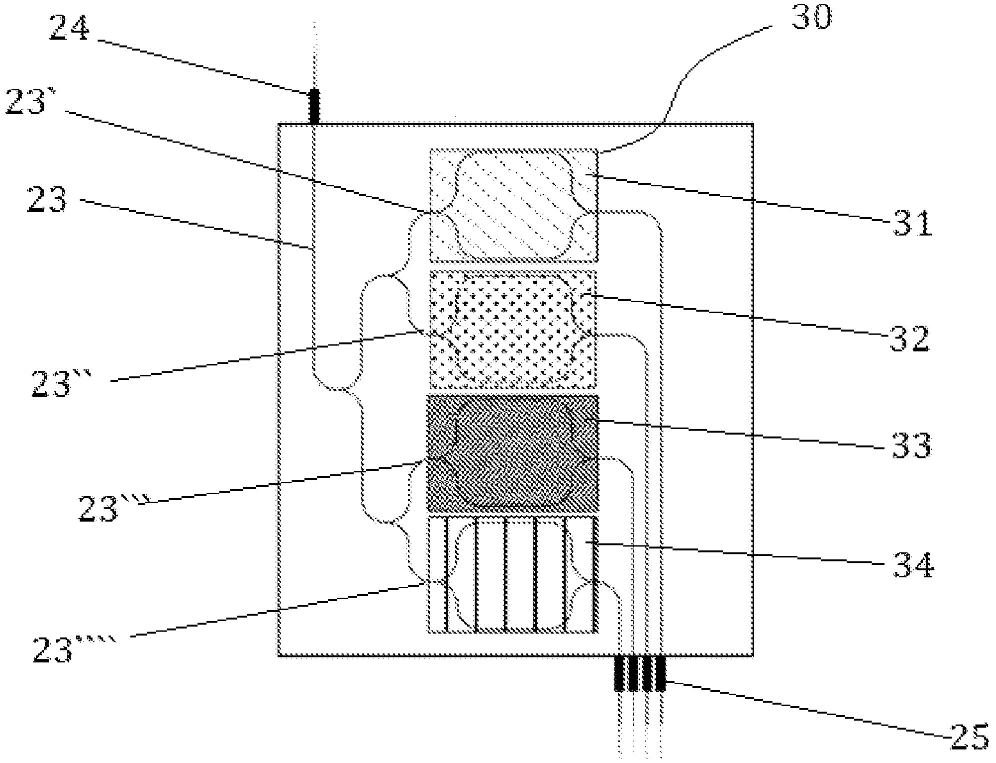
FIG. 2 shows the structural scheme of one embodiment of the sensor chip.

According to another embodiment, the sensor comprises at least four optically connected in parallel Mach-Zehnder interferometer structures (23', 23'', 23''', 23'''')—FIG. 2, which are created in the polymer layer and having different claddings (31, 32, 33, 34). In this embodiment, the polymer cladding one (31) has pores size from 0.23 nm to 0.35 nm; the polymer cladding two (32) has pores size from 0.18 nm to 0.25 nm; the polymer cladding three (33) has pores size from 0.13 nm to 0.2 nm; the polymer cladding four (34) has pores size from 0.08 nm to 0.15 nm.

Figure 3:
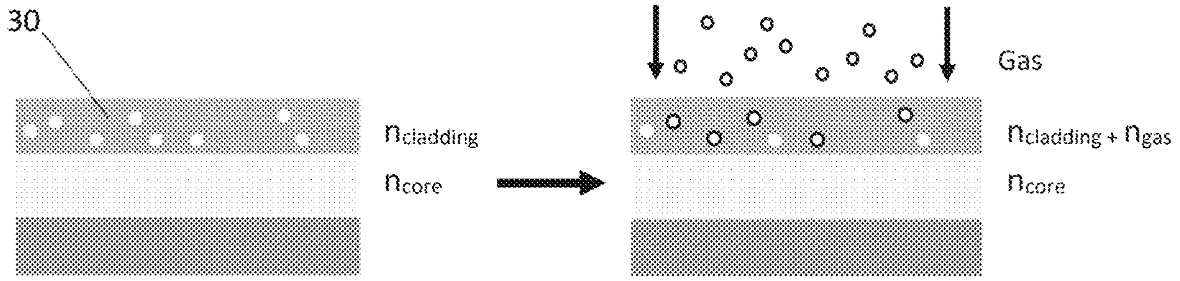
FIG. 3 schematically shows gas interaction with cladding layer and induced refractive index changes due to filling of pores of the cladding layer.

Due to external gas filling pores of cladding material, refractive index of cladding (30) changes (FIG. 3). As part of mode is dilated in to cladding (30), refractive index changes in this layer also influence the mode transmittance through device through change its phase. As the device is made asymmetric, there will be a phase difference between both interferometer arms, leading to changes in output intensity. By detecting these changes, external gas presence can be detected. For this purpose, the device needs to have single-mode waveguides at the working wavelength. This can be achieved through waveguide dimension tuning. Asymmetry alterations will allow to measure wide range of Ammonia concentrations (lower asymmetry for low concentration, higher asymmetry for larger concentrations). Different claddings (30) allow to selectively measure concentrations of other gases that could be present in the environment.

Figure 4:
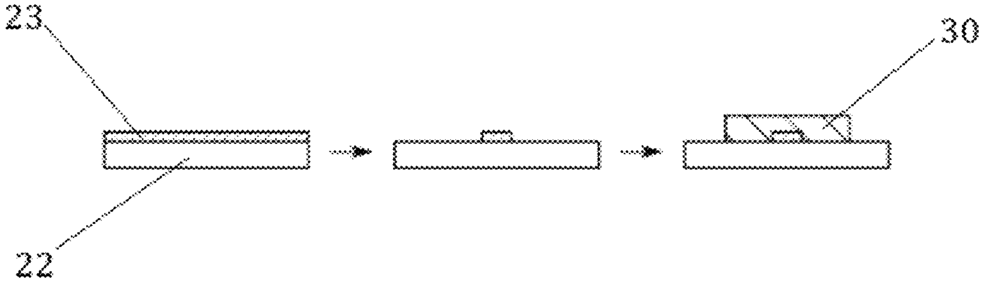
FIG. 4 shows the manufacturing workflow.

The method for manufacturing of the sensor chip (2) for the selective gas sensor is also claimed. The method comprising the following steps: (i) providing at least one substrate (22), comprising of a glass, a quartz, or a polymer film; (ii) depositing on the substrate (22) at least one photoresist layer of epoxy-based negative photoresist; (iii) creation at least two optically connected in parallel Mach-Zehnder interferometer structures (23) in the polymer layer; (iv) deposition of polymer claddings (30) on each Mach-Zehnder interferometer structure (23); (v) thermal treatment of the polymer claddings (30) selecting thermal treatment time and temperature to create the desired pores size of each polymer claddings (30) to obtain different pores size of the polymer claddings (31, 32, 33, 34) on respective Mach-Zehnder interferometer structures (23', 23", 23'", 23"")—FIG. 4.

The epoxy-based negative photoresist can be any epoxy-based negative photoresist, having refractive index between 1.58-1.7 at 633 nm.

According to the invention, depositing on the substrate (22) of at least one photoresist layer of epoxy-based negative photoresist can be made by spin-coating; creation of the Mach-Zehnder interferometer structures (23) in the polymer layer can be made by optical lithography; deposition of the polymer claddings (30) on the Mach-Zehnder interferometer structures (23) can be made by spray-coating.

According to one embodiment of the method, at the step (iii) at least four optically connected in parallel Mach-Zehnder interferometer structures (23', 23", 23'", 23"") are created in the polymer layer.

In general, to get polymer cladding with desired properties, it is thermally treated at the temperature from 55 to 150° C. for 30-400 seconds. According to invention, the connected in parallel Mach-Zehnder interferometer structures (23', 23", 23'", 23""), created in the polymer layer, each having claddings with different properties.

In the particular embodiment with four in parallel connected Mach-Zehnder interferometer structures (23', 23", 23", 23"") have pores size as follows: the polymer cladding one (31)—from 0.23 nm to 0.35 nm; the polymer cladding two (32)—from 0.18 nm to 0.25 nm; the polymer cladding three (33)—from 0.13 nm to 0.2 nm; the polymer cladding four (34)—from 0.08 nm to 0.15 nm. To achieve this the thermal treatment of the polymer claddings (30) at the step (v) of the above method, is made by keeping first polymer cladding (31) at the temperature from 60 to 75° C. for 60-300 seconds; second polymer cladding (32) at the temperature from 75 to 90° C. for 60-300 seconds; third polymer cladding (33) at the temperature from 90 to 105° C. for 60-300 seconds; fourth polymer cladding (34) at the temperature from 105 to 120° C. for 60-300 seconds.

EXAMPLES OF IMPLEMENTATION OF THE INVENTION

Figure 5:
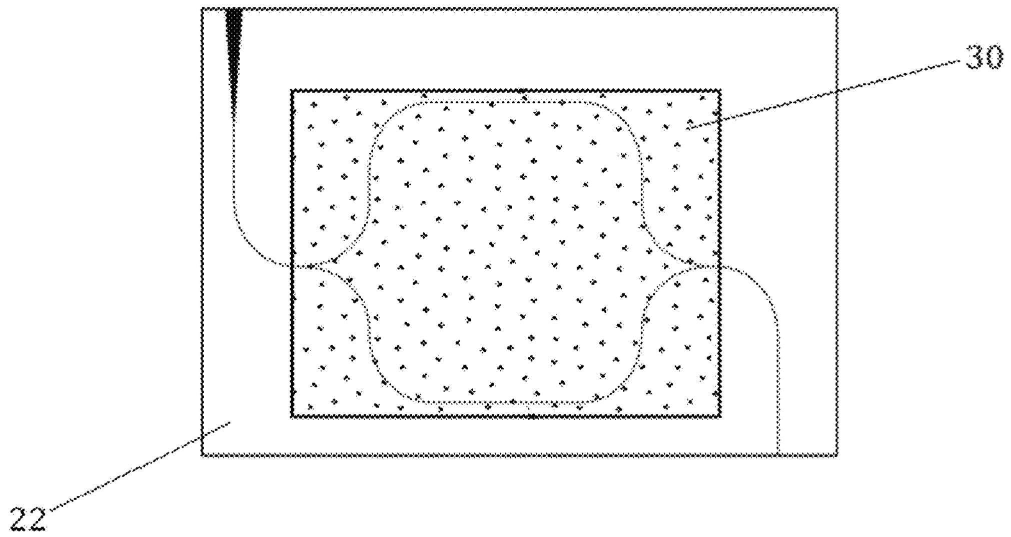
FIG. 5 shows the scheme of a test device.
Figure 6:
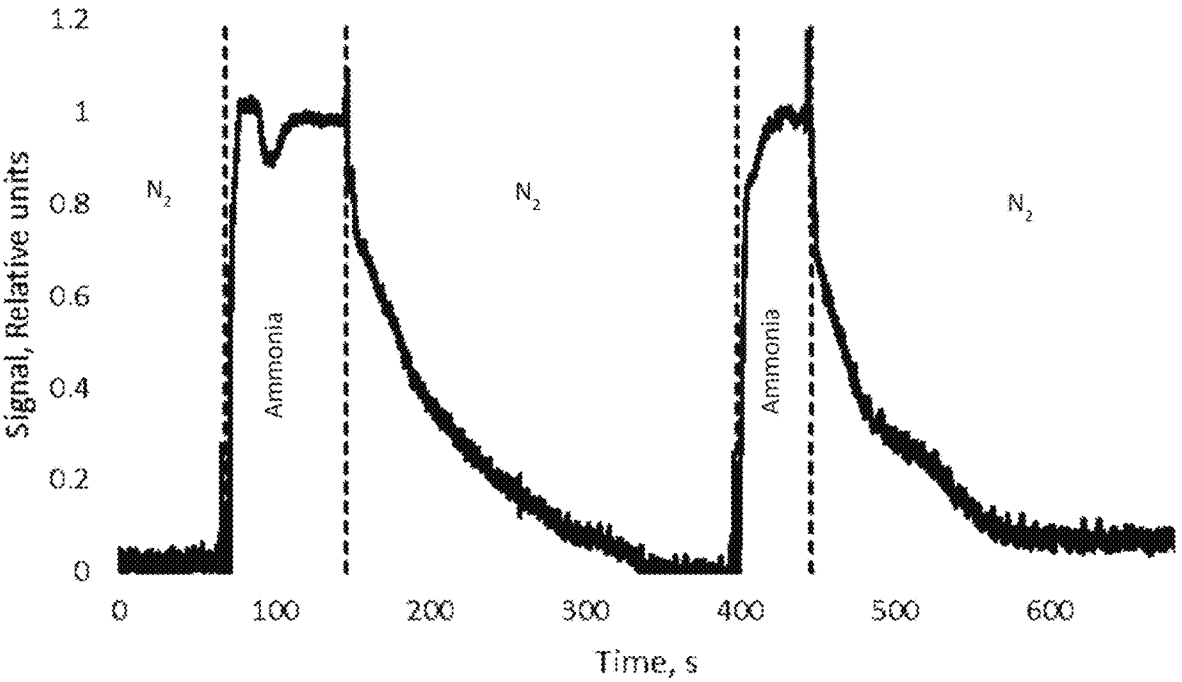
FIG. 6 shows an example of an experimental measurement of the proposed sensor signal, when exposed to 50 ppm ammonia in nitrogen.

Example 1. According to one embodiment, the device comprises asymmetrical Mach-Zehnder Interferometers (23) based on SU-8 waveguides structures. The Mach-Zehnder Interferometer (23) part of the structure is coated with PMMA (FIG. 5). Firstly, a SU-8 layer of thickness 1.2 um is deposited on the substrate using the spin-coating technique. The device is then structured using a direct write lithography procedure with illumination wavelength of 365 nm. Waveguide input consists of a taper structure with the input of 10 μm that converts to a 1 μm wide waveguide over 5 mm length. The rest of the waveguide structure consists of a 1 μm wide waveguide. The asymmetrical Mach-Zehnder Interferometer (23) has one arm with a length of 10 mm while the other arm has a length of 10.125 mm. These structures are coated with PMMA using the spray-coating method. To do this PMMA is firstly dissolved in anisole and then sprayed through a mask on top of the structures to produce a 2 μm thick layer. To test device sensitivity, the light irradiation with a wavelength of 632.8 nm is coupled into the chip with the lens with a magnification of 20×, and output light is collected also with lens with a magnification of 20×. The sensor is periodically exposed to 50 ppm ammonia gas in nitrogen. Examples of experimental data are shown in FIG. 6.

Figure 7:
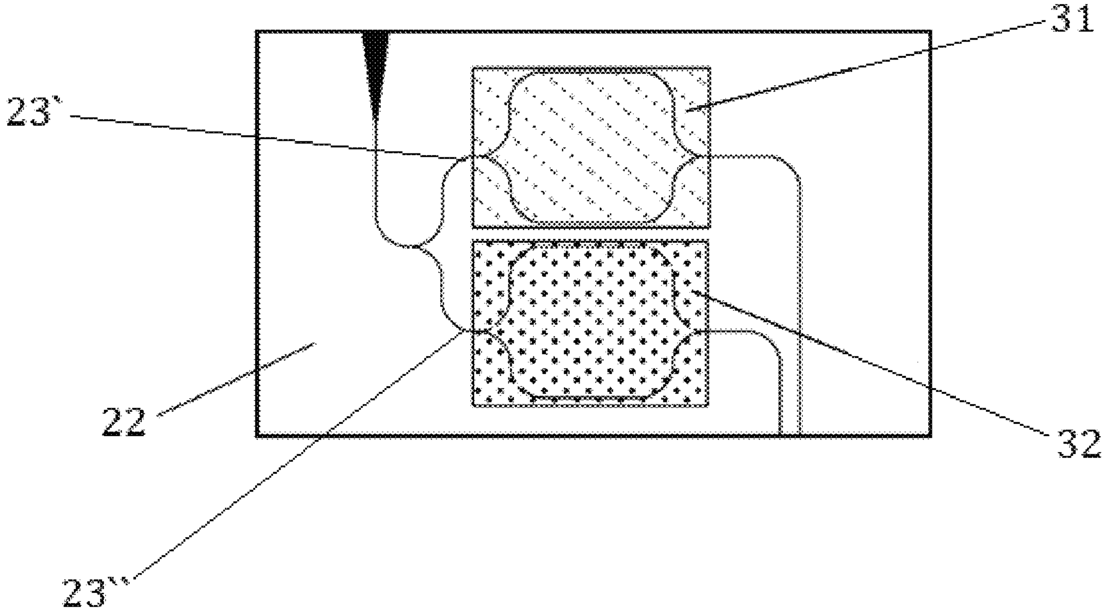
FIG. 7 shows the structural scheme of another embodiment of the sensor chip.
Figure 8:
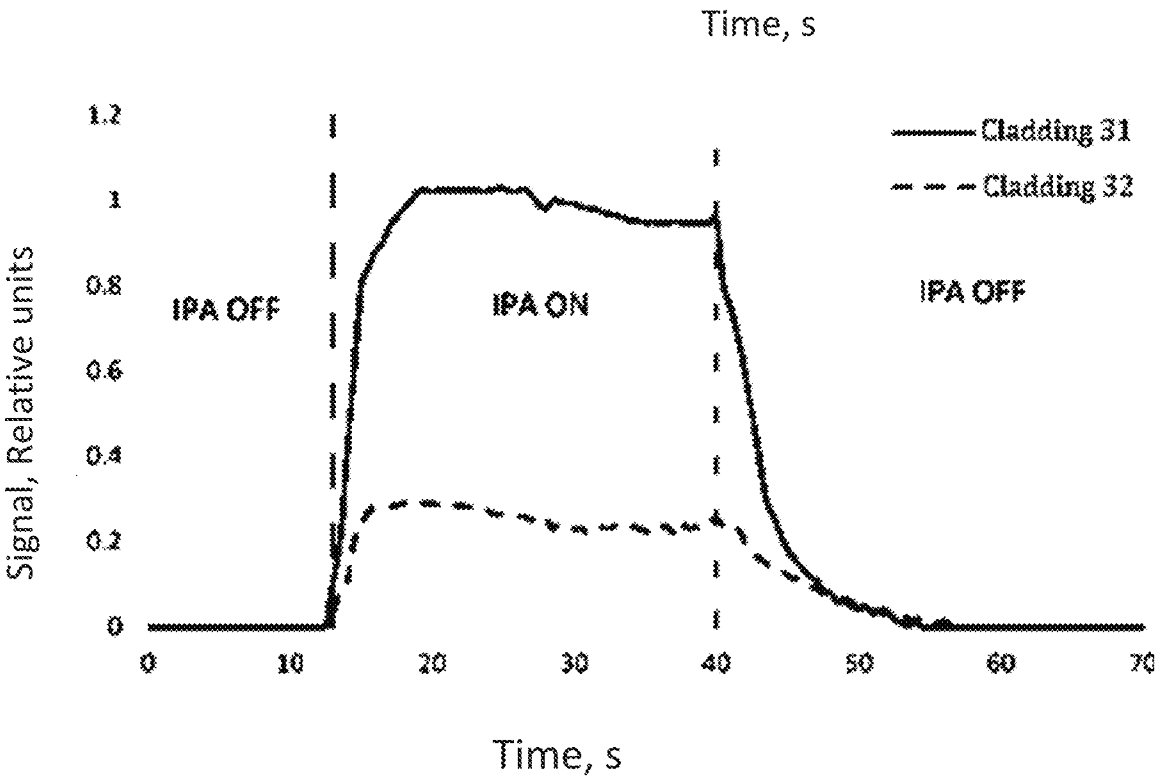
FIG. 8—shows an example of an experimental measurement of the proposed sensor signal, when exposed to Isopropanol vapours.

Example 2. According to another embodiment, the device comprises two asymmetrical Mach-Zehnder interferometers (23', 23") based on SU-8 waveguides structures (FIG. 7). Both of the Mach-Zehnder interferometer (23', 23") part of the structure is coated with PMMA. The device is then structured using a direct write lithography procedure with illumination wavelength of 365 nm. Waveguide input comprises a taper structure with the input of 10 μm that converts to a 1 μm wide waveguide over 5 mm length. The rest of the waveguide structure comprises a 1 μm wide waveguide. Both asymmetrical Mach-Zehnder interferometers (23', 23") have one arm with a length of 10 mm while the other arm has a length of 18 mm. These structures are coated with PMMA using the spray-coating method. After cladding deposition on first Mach-Zehnder interferometer (23"), the cladding (31) is baked at 120° C. for 5 min. After cladding deposition on the second Mach-Zehnder interferometer (23"), the cladding (32) is baked at 60° C. for 5 min. Due to the time and temperature difference in the baking procedures of each cladding (31, 32), the pore size will be different. This will strongly influence sensitivity to larger molecules while having minimal impact to detection of smaller molecules. To test device sensitivity, the light irradiation with a wavelength of 632.8 nm is coupled into the chip with the lens with a magnification of 20×, and output light is collected also with lens with a magnification of 20×. The sensor was periodically exposed to Isopropanol (IPA) vapours. Comparison of both sensor sensitivity to IPA is shown in FIG. 8. When embodiment according to this exampled was exposed to ammonia gas, the sensors showed no sensitivity change. The tested sensitivity to water was the same for both sensors.

Main advantage of the device is its high sensitivity, fast response time, robustness and simple fabrication. Thus, the sensor according to the present invention can be effectively used for ammonia detection. This is especially important for such areas as animal farms and cooling systems that use ammonia.

SOURCES OF INFORMATION

1. Liu, X. et al. Sensors 12, 9635-9665 (2012).
2. Bamiedakis, N. et al. J. Light. Technol. 31, 1628-1635 (2013).
3. WO 2021/152345 A1;
4. Ali, A. R. et al. Chemosensors 5, 19 (2017).
5. Foreman, M. R. et al. Adv. Opt. Photonics 7, 168 (2015).
6. Hugon, O. et al. Sensors Actuators B Chem. 51, 316-320 (1998).
7. Sturaro, M. et al. Proceedings 1, 319 (2017).
8. Qin, J. et al. J. Phys. Chem. C 121, 24740-24744 (2017).
9. St-Gelais, R. et al. Sensors Actuators B Chem. 182, 45-52 (2013).

10. Gouvêa, P. M. P. et al. 96343D (2015).
11. GazDetect. https://www.gazdetect.com/download/pdf-anglais-infos-dg/EN-CSC300-Web.pdf.
12. Aeroqual. https://www.aeroqual.com/voc-sensors-monitors.
13. Evikon. https://www.evikon.eu/en/evikon-mci-m-1/solvent-vapors-detector-transmitter-e2608-voc-p-199.
14. Ion Science. https://www.jonscience.com/products/tiger-handheld-voc-detector/?gclid=CjwKCAiA9]bwBRAAEiwAnWa4Q5OXzBfxAL0M0w6Ee0c022jaDoQoiKacIOt4qePfFRKl9eGRLJK-Yxo-CEKsQAvD_BwE.
15. U.S. Pat. No. 5,262,842 A.
16. WO 2021/152345 A1.
17. Chalyan T. et al.: Asymmetric Mach-Zehnder Interferometer Based Biosensors for Aflatoxin M1 Detection. Biosensors, vol. 6, no. 1. Jun. 1, 2016, DOI: 10.3390/bios6010001.

The invention claimed is:

1. A selective gas sensor, comprising a light source, a sensor chip and a light detector; the sensor chip having an optical input and an optical output, where the light source is optically connected with the optical input of the sensor chip; the optical output of the sensor chip is optically connected with the optical input of the light detector with ability to guide a light from the light source output, through the sensor chip, to the optical input of the light detector; wherein the sensor chip comprises a substrate, an asymmetric Mach-Zehnder interferometer, having an input and an output; and a cladding, wherein the asymmetric Mach-Zehnder interferometer includes multiple asymmetrical Mach-Zehnder interferometer structures optically connected in parallel, each having different pores size of the polymer cladding that covers both the reference arm and the measurement arm of each respective Mach-Zehnder interferometer, and has multiple outputs that correspond to each of the Mach-Zehnder interferometer structures outputs; wherein the pore sizes of each polymer cladding differ by 0.02 nm to 0.1 nm.

2. The selective gas sensor according to claim 1, wherein the substrate comprises a glass, a quartz, or a polymer film.

3. The sensor according to claim 2, wherein the light source, the sensor chip, and the light detector are optically connected with an optical fiber.

4. The sensor according to claim 2, wherein the polymer cladding one has pores size from 0.23 nm to 0.35 nm; the polymer cladding two has pores size from 0.18 nm to 0.25 nm; the polymer cladding three has pores size from 0.13 nm to 0.2 nm; and the polymer cladding four has pores size from 0.08 nm to 0.15 nm.

5. The sensor according to claim 1, wherein the light source, the sensor chip, and the light detector are optically connected with an optical fiber.

6. The sensor according to claim 5, wherein the polymer cladding one has pores size from 0.23 nm to 0.35 nm; the polymer cladding two has pores size from 0.18 nm to 0.25 nm; the polymer cladding three has pores size from 0.13 nm to 0.2 nm; and the polymer cladding four has pores size from 0.08 nm to 0.15 nm.

7. The sensor according to claim 1, wherein the polymer cladding one has pores size from 0.23 nm to 0.35 nm; the polymer cladding two has pores size from 0.18 nm to 0.25 nm; the polymer cladding three has pores size from 0.13 nm to 0.2 nm; and the polymer cladding four has pores size from 0.08 nm to 0.15 nm.

8. A method for manufacturing of the sensor chip for the selective gas sensor according to claim 1, comprising the following steps:

(i) providing at least one substrate, comprising of a glass, a quartz, or a polymer film,
(ii) depositing on the substrate at least one photoresist layer of epoxy-based negative photoresist,
(iii) creation at least two optically connected in parallel Mach-Zehnder interferometer structures in the polymer layer,
(iv) deposition of polymer claddings on each Mach-Zehnder interferometer structure,
(v) thermal treatment of the polymer claddings selecting thermal treatment time and temperature to create the desired pores size of each polymer claddings to obtain different pores size of the polymer claddings on respective Mach-Zehnder interferometer structures.

9. The method according to claim 8, wherein depositing on the substrate of at least one photoresist layer of epoxy-based negative photoresist is made by spin-coating.

10. The method according to claim 8, wherein creation of the Mach-Zehnder interferometer structures in the polymer layer is made by optical lithography.

11. The method according to claim 8, wherein deposition of the polymer claddings on the Mach-Zehnder interferometer structures is made by spray-coating.

12. The method according to claim 8, wherein at the step (iii) at least four optically connected in parallel Mach-Zehnder interferometer structures are created in the polymer layer.

13. The method according to claim 8, wherein thermal treatment of the polymer claddings at the step (v) is made by keeping first polymer cladding at the temperature from 60 to 75° C. for 60-300 seconds; second polymer cladding at the temperature from 75 to 90° C. for 60-300 seconds; third polymer cladding at the temperature from 90 to 105° C. for 60-300 seconds; and fourth polymer cladding at the temperature from 105 to 120° C. for 60-300 seconds.

* * * * *